(12) United States Patent
Van Den Ende

(10) Patent No.: US 6,536,159 B1
(45) Date of Patent: Mar. 25, 2003

(54) PLANT POT

(76) Inventor: Peter Hubertus Elisabeth Van Den Ende, Palmstraat 38, NL-6413 RC Heerlen (NL)

( * ) Notice: Subject to any disclaimer, the term of this patent is extended or adjusted under 35 U.S.C. 154(b) by 0 days.

(21) Appl. No.: 09/744,253

(22) PCT Filed: Jul. 19, 1999

(86) PCT No.: PCT/NL99/00465

§ 371 (c)(1),
(2), (4) Date: Apr. 2, 2001

(87) PCT Pub. No.: WO00/05939

PCT Pub. Date: Feb. 10, 2000

(30) Foreign Application Priority Data

Jul. 31, 1998 (NL) .............................. 1009780

(51) Int. Cl.⁷ ................................................ A01G 9/02
(52) U.S. Cl. ............................ 47/66.1; 47/80; 47/66.3; 47/71
(58) Field of Search .................... 47/66.1, 64, 65.7, 47/65.8, 66.3, 66.6, 80, 81, 86, 71, 48.5, 59

(56) References Cited

U.S. PATENT DOCUMENTS

| | | | | | |
|---|---|---|---|---|---|
| 910,905 | A | * | 1/1909 | Clements | |
| 2,722,779 | A | * | 11/1955 | Allderdice | |
| 3,220,144 | A | * | 11/1965 | Green | |
| 4,265,050 | A | * | 5/1981 | Buescher | 47/79 |
| 4,287,682 | A | * | 9/1981 | Browne | 47/81 |
| 4,344,251 | A | * | 8/1982 | Edling | 47/80 |
| 4,885,870 | A | * | 12/1989 | Fong | 47/79 |
| 4,908,984 | A | * | 3/1990 | Lenke | 47/58 |
| 5,136,806 | A | * | 8/1992 | Kang | 47/81 |
| 5,189,835 | A | * | 3/1993 | Green | 47/80 |
| 5,269,094 | A | * | 12/1993 | Wolverton et al. | 47/62 |
| 6,058,647 | A | * | 5/2000 | Emalfarb | 47/1.01 R |
| 6,070,359 | A | * | 6/2000 | Liu | 47/79 |
| 6,253,488 | B1 | * | 7/2001 | Murfin | 47/65.7 |

FOREIGN PATENT DOCUMENTS

| | | | | |
|---|---|---|---|---|
| CH | 637264 | * | 7/1983 | .......... A01G/27/00 |
| DE | 29 25 150 | | 1/1981 | |
| DE | 32 11 985 | | 10/1983 | |
| FR | 1.480.584 | | 5/1967 | |
| FR | 2618297 | * | 1/1989 | |
| GB | 1173421 | | 12/1969 | |
| GB | 2163335 A | * | 2/1986 | ............ A01G/9/02 |
| GB | 2 218 609 | | 11/1989 | |
| JP | 03-53804 | * | 3/1991 | |
| JP | 06-105622 | * | 6/1994 | |
| JP | 06-181639 | * | 6/1994 | |
| JP | 06-181641 | * | 6/1994 | |
| LU | L-969 | | 1/1970 | |
| WO | WO 96/32834 | | 10/1996 | |

OTHER PUBLICATIONS

Derwent Publications, AN 96–166208, JP 8 047344, Feb. 20, 1996.

\* cited by examiner

*Primary Examiner*—Peter M. Poon
*Assistant Examiner*—Andrea Valenti
(74) *Attorney, Agent, or Firm*—Oblon, Spivak, McClelland, Maier & Neustadt, P.C.

(57) ABSTRACT

The invention relates to a plant pot comprising a first space (1) bounded by a first upright wall (4) and a second space (2) bounded by a second upright wall (5) and a bottom (7), which first and which second space (1,2) are separated from each other by a porous plate (9). The plant pot is according to the invention characterized in that a third space (3) bounded by a third upright wall (6) and a bottom (8) surrounds the second space (2), and in that the second space (2) serves to accommodate a moisture-retaining, hydrating but air-permeable material (12).

9 Claims, 6 Drawing Sheets

PLANT POT

The invention relates to a plant pot comprising a first space bounded by a first upright wall and a second space bounded by a second upright wall and a bottom, which first and which second space are separated from each other by a porous plate.

Such a plant pot is for example known from International patent application No. PCT/CA96/00243, published under No. WO 96/32834. Said patent publication shows a plant pot comprising a first and a second space, which are separated from each other by means of a porous plate. The first space of such a plant pot is filled with potting compost, into which the plants are subsequently placed, whilst the second space is filled with water. During the development of the plant, a root system will develop in said potting compost, via which the plant obtains nutrients from the potting compost. Furthermore, the roots will penetrate through the porous plate into the second space so as to take up moisture. Furthermore, the plant pot according to WO 96/32834 comprises additional parts and openings for the supply of air and water.

The drawback of such a plant pot is the fact that the roots which have grown through the porous plate and which continuously hang in the water are very sensitive to root rot. In addition, the water-filled space will become polluted rather quickly, so that bacteria and fungi, which may affect the plant in the plant pot, can readily develop therein. The plant pot furthermore comprises insufficient provisions to ensure an adequate air circulation, which, as may be considered to be generally known, is also essential to a healthy development of the plant.

The object of the invention is to overcome the above drawbacks and to provide an improved plant pot, which by its construction contributes towards a strongly improved growth development of the plant, without the development of root rot, bacteria and/or fungi cultures, which are harmful to the plant.

In order to accomplish that objective, the plant pot is characterized in that a third space bounded by a third upright wall and a bottom surrounds the second space, and in that said second space serves to accommodate a moisture-retaining, hydrating but air-permeable material. The provision of a third space surrounding the second space not only results in a strongly improved air circulation, which is essential to the development of the plant, but in addition, the roots growing through the porous plate into the second space will be able to develop in a moist but air-permeable space, thus preventing root rot and/or bacteria and fungi cultures from developing. Thus, an ideal growth development of the plant is created, which benefits the quality as well as the yield of the plant.

In one embodiment of the plant pot according to the invention, the porous plate may be a flexible plate. At least one supporting element can support the porous plate thereby, which supporting element may be pivotally connected to the first or the second wall or which may be supported on the first or the second wall. This provides some support for the plant, which grows in the first space.

In one specific embodiment, the plant pot comprises at least one indication element extending beyond the second and/or the third upright wall, which element functions to indicate the moisture content of the moisture-absorbing material. The indication element may form part of a supporting element or of the porous plate. Due to the hydrating characteristic of the moisture-retaining, but air-permeable material which is present in the second space, the volume dimensions of said material depend on the amount of moisture it has absorbed. During the moisture take-up by the root system of the plant, the moisture content, and consequently the volume of the material present in the second space, will decrease. Due to the flexible construction of the porous plate, the plant present in the first space and the potting compost will likewise move in response to said volume change. The potting compost will start to work as a result of said movements, which benefits the structure, the air supply and the environment of the compost. This in turn benefits the growth development of the plant.

The construction of the indication element enables easy read-out of the moisture content of the material in the second space.

In one embodiment of the plant pot according to the invention, the second upright wall is provided with a large number of openings. Not only does this stimulate the air circulation to the roots, but it also enables a simple application of moisture to the second space.

The plant pot according to the invention can also be characterized in that the first and the second upright wall continue into each other. The third upright wall may surround the first space, or the first and the third wall may continue into each other. Plant pot constructions of this kind not only have a positive effect on the development of the plant, but they also make it possible to manufacture such a plant pot in large numbers, for example by means of an injection moulding process.

In one embodiment of the plant pot according to the invention, the third upright wall may be at least partially transparent. Such partially transparent constructions of the third upright wall make it possible to use a moisture level indicator in the third space.

According to another aspect of the invention, the plant pot can be characterized in that the bottom of the second space forms an integral part with the bottom of the third space. In another embodiment of the plant pot, the bottom of the second space may be connected to the bottom of the third space by means of snap connections or clamped connections.

This makes it possible to move the assembly consisting of the first and the second space together with the plant, for example for repotting.

The first upright wall is preferably removable, so as to be able to repot the plant to a large plant pot during its growth development.

The invention will now be explained in more detail with reference to a drawing. In the drawing.

Figure 1A:
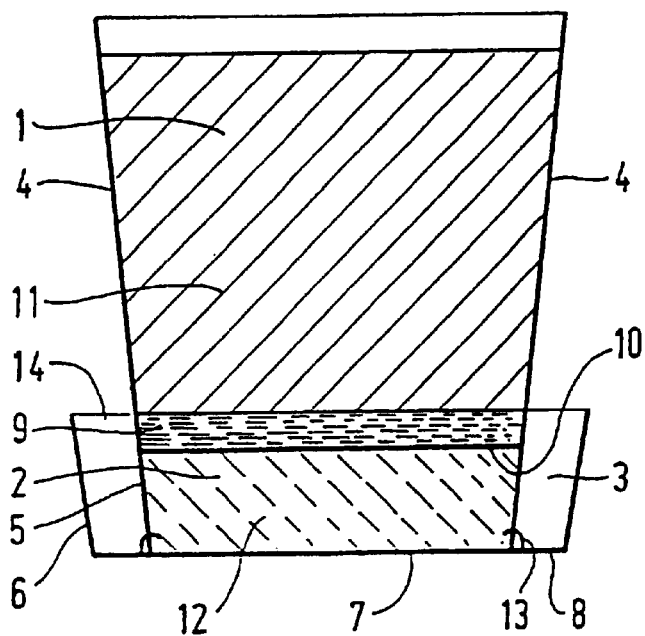
FIGS. 1a–1d show various embodiments of a plant pot according to the invention.

FIGS. 1a–1d show various embodiments of a plant pot according to the invention. Like parts are indicated by the same numerals in the various embodiments. The plant pot as shown in FIG. 1a comprises a space 1, which is bounded by upright walls 4. The plant pot furthermore comprises a second space 2, which is bounded by a second upright wall 5 and a bottom 7. The two spaces 1 and 2 are separated from each other by means of a porous plate 9. The porous plate 9 is supported by a supporting element 10, which element may or may not be pivotally connected to upright wall 4 or 5. Supporting element 10 may also be loosely supported on wall 4 or 5, whereby it may or may not extend through openings in wall 4 or 5, so as to be held in position.

During use of the plant pot, space 1 is filled with potting compost 11, into which a cutting of the plant to be potted (not shown) is placed.

As is shown in FIG. 1a and further, space 2 is surrounded by a third space 3, which is made up of upright wall 6 and bottom 8.

The operation of the plant pot is as follows. Water can be poured into space 3, for example by means of a water hose or a watering can, via opening 14 that is present therein. The upright wall 5 of space 2 is provided with a large number of openings (not shown). The water that is poured into space 3 can penetrate, via said openings, into space 2, where it is absorbed and retained by material 12. Hydration of moisture by material 12 will cause the material to increase in volume, whereby it will occupy (substantially) the entire space 2. The non-hydrated water will remain behind in space 3. During its growth, the cutting will develop a root system in potting compost 11. Parts of said root system will root in potting compost 11 and take up nutrients and/or minerals from the compost for the growth of the plant.

In addition, roots will grow through porous plate 9 into space 2, where they will take up moisture which is delivered to the roots by the moisture-absorbing material 12. As a result of this, the roots do not hang in a layer of water, thus preventing root rot and bacteria and fungi cultures, which are harmful to the development of the plant, from developing. Moreover, the roots can regulate their moisture take-up from moisture-absorbing material 12 themselves, which not only has a positive effect on the development of the plant, but which also minimizes the occurrence of undesirable situations, such as a shortage of moisture.

In addition, the oxygen which the plant needs can easily reach the roots in space 2 via opening 14, space 3 and the openings in upright wall 5. Not only the air-permeable characteristic of material 12, but also space 3, which completely surrounds space 2, enable an ideal air circulation. Thus, an aerobic environment which is essential for the plant is created and maintained. The water no longer needs to be supplied to the potting compost 11 in space 1 from above. Thus, the potting compost 11 in space 1 is prevented from shrinking and the nutrients and minerals which are present in said compost are prevented from being washed out and thus being lost to the plant. Since shrinkage of the potting compost 11 is prevented, the airy structure of the potting compost as well as the pH-value, and also the related aerobic environment, are preserved for the plant. All these factors provide an optimum growth development for the plant.

In this embodiment, the upright wall 5 of space 2 continues into upright wall 4 of space 1, thus forming one whole. In addition, the plant pot is provided with snap connections or clamped connections 13, which connect upright wall 5 to bottom 8 of space 3. This makes it possible to lift the assembly of spaces 1 and 2 from space 3 for repotting purposes.

Figure 1B:
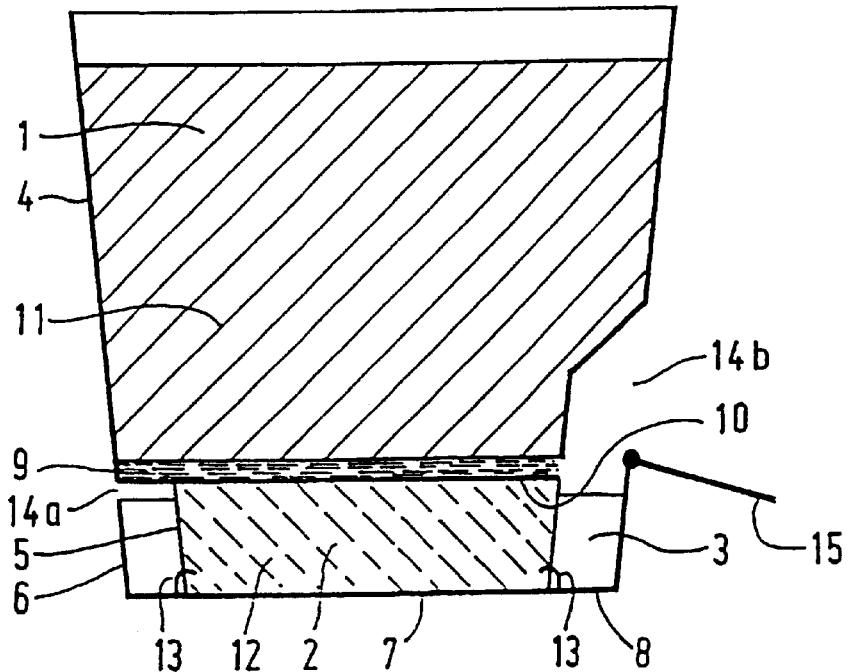

FIG. 1b shows a slightly different embodiment of the plant pot according to the invention. Space 1 is wider than space 2, and upright wall 6 of space 3 is in line with upright wall 4 of space 1. They are not connected, however, but separated from each other by means of openings or by slot 14 which extends circumferentially around the pot. Also said openings 14 function to enable air circulation round space 2. Water can be supplied in a simple manner via opening 14b, which opening can be closed by means of a pivoted flap 15. Although this plant pot, too, is provided with snap connections or clamped connections 13 for removing spaces 1 and 2 from space 3, said snap connections or clamped connections 13 are not necessary. Bottom 7 of space 2 and bottom 8 of space 3 form an integral part with each other in that case, and the plant pot constitutes an independent construction. The contour of upright wall 6 thereby follows the contour of upright wall 4.

Figure 1C:
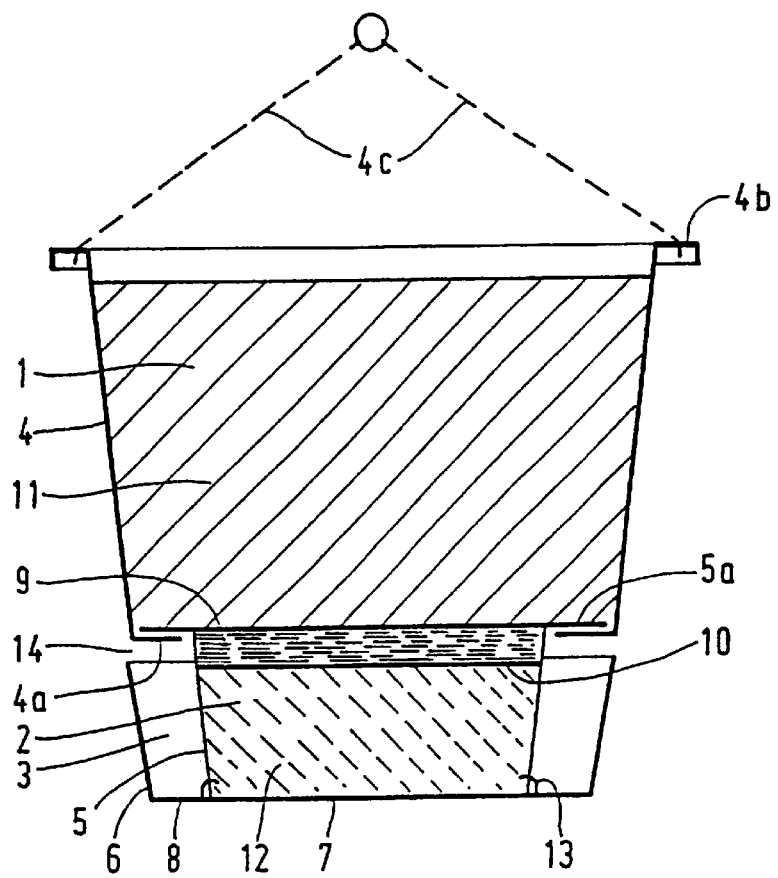

FIG. 1c shows a plant pot whose construction more or less corresponds to the construction as shown in FIG. 1a, with this difference that space 1 of FIG. 1c is wider than space 2 and that the contour of upright wall 6 follows the contour of upright wall 4. The illustrated plant pot is of the repottable type, due to the presence of the snap connections or clamped connections 13, which connect bottom 7 to bottom 8. Upright wall 4 can be removed from the plant pot for the purpose of repotting the plant which is present in potting compost 11. Space 1 and space 2 can be removed from space 3 as a whole by releasing the snap connections or clamped connections 13. Upright wall 4 is provided with a flanged edge 4a, which hooks behind flange 5a of upright wall 5. A detached root ball and plant formed by space 2 and potting compost 11 is obtained by moving upright wall 4 downwards. Said root ball, which is kept together by the root system of the plant to be repotted, can now be easily joined with an upright wall 4, which is larger or wider now. In that case, said new and larger upright wall 4 must likewise have a flanged edge 4a, which hooks behind flange 5a of upright wall 5. Then the larger assembly of spaces 1 and 2 can be placed back into space 3, whereby the snap connections or clamped connections 13 connect bottom 7 to bottom 8. After said repotting, a larger plant pot has been formed, which allows further development of the plant. The advantage of such a construction of the snap connections or clamped connections 13 and the removable upright wall 4 is that the repotting operation can be repeated several times until the plant has grown to its desired size. Although upright wall 4 hooks behind flange 5a of upright wall 5 by means of an edge 4a in the illustrated embodiment, the connection between upright wall 4 and upright wall 5 can also be effected by means of a snap connection or a clamped connection.

In this embodiment, wall 4 is provided on it upper side with a flanged edge 4b, by means of which wall 4 can be supported on an edge of a further container or ornamental pot, or which edge 4b can function to attach a number or strings or wires 4c thereto, by which the pot can be suspended.

Figure 1D:
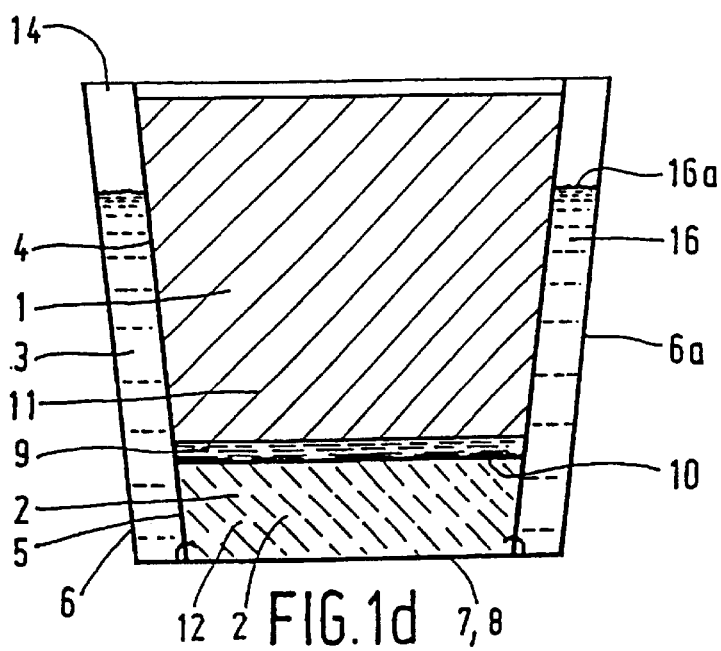

FIG. 1d shows another construction of the plant pot according to the invention. In this embodiment, the upright wall 5 of space 2 continues into upright wall 4 of space 1, and upright wall 6 of space 3 fully surrounds the first and the second space. Thus, a double-walled plant pot has been obtained, wherein space 3 can be filled with water. Wall 6 of space 3 may be partially transparent, for example in the form of a transparent strip of material, which follows the describing line of upright wall 6. Said transparent strip of material 6a can function as a water gauge for reading the level 16a of the water 16 that is present in space 3. Thus, it can be verified in a simple manner whether the plant is running dry, and water can be replenished in time.

Figure 2A:
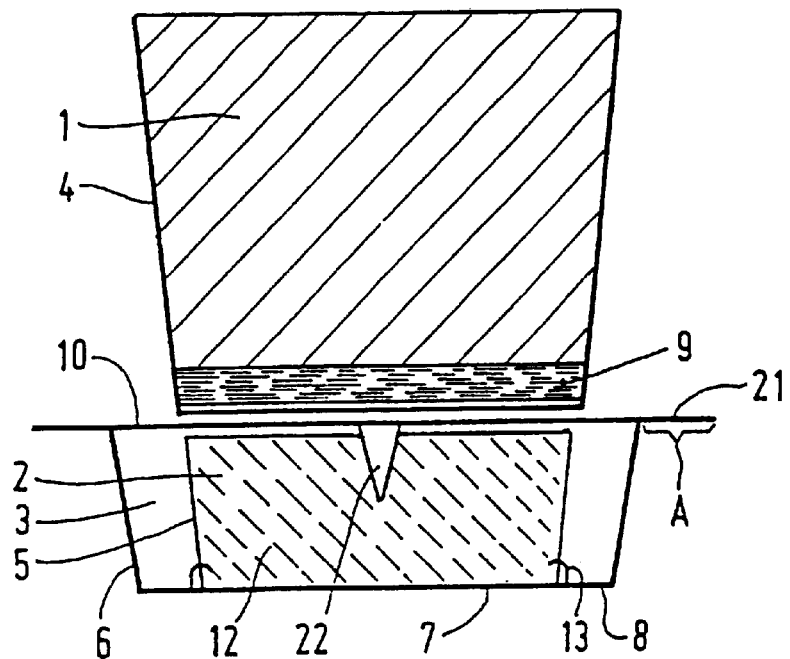
FIGS. 2a and 2b show an embodiment of a plant pot according to the invention which is provided with moisture-content indicators.
Figure 2B:
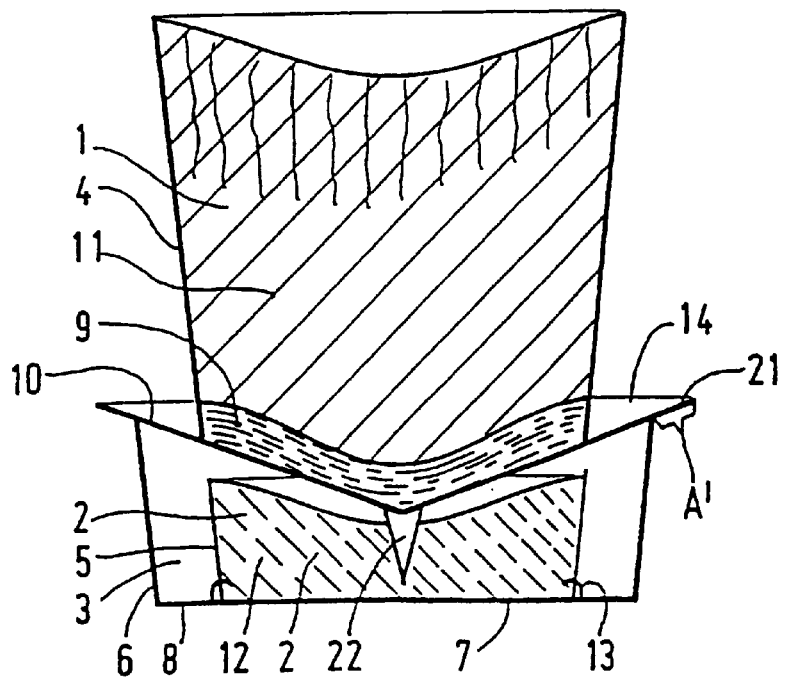

FIGS. 2a and 2b show a plant pot according to FIG. 1a, wherein the plant pot is also provided with indicators for the moisture content of the material 12 in space 2. As already described above, space 2 is filled with a material 12 which not only is moisture-absorbing and air-permeable, but whose volume depends on its moisture content, in order to ensure a correct use of the plant pot according to the invention. In the case of complete saturation with water, material 12 will occupy space 2 (practically) completely. An example of a material which is highly suitable for that purpose is a granular polymer product, which is marketed under the trademark Broadleaf P4. During the development of the plant, the plant roots will grow from space 1, through porous plate 9, into space 2, where they will obtain air as well as moisture from material 12. The moisture content of the moisture-absorbing and air-permeable material 12 is maintained by the water which is still present in space 3 and which can reach space 2 via the openings formed in wall 5, in which space 2 said water can be absorbed by the moisture-absorbing material. Since the construction allows the plant to regulate its own water take-up via its roots, the plant pot according to the invention can remain operational for a long period of time without interference from outside. From the moment that all the water present in space 3 has been absorbed by material 12 via the openings in upright wall 5, the moisture content of the moisture-absorbing material 12 will decrease upon further take-up of moisture by the roots. Consequently, also the reduction in the volume of the moisture-absorbing material 12 in space 2 will become less. Preferably, the porous plate 9 is a flexible plate, just like supporting element 10, which is incorporated in the construction in the above-described manner. Supporting element 10 is thereby provided with indication elements 21, which extend a distance A beyond upright wall 5 or 6. Near the middle or centre of space 2, supporting plate 10 is provided with a cam 22 extending towards bottom 7. The indication elements 21 may be in the form of an extension of the supporting element, as is shown in FIGS. 2a and 2b. They may also be in the form of elongated elements, however, which extend beyond wall 5 or 6 and which are connected to cam 22 through space 2.

As already said before, the volume of material 12 in space 2 will decrease upon further moisture take-up from material 12. The plant will subside under the influence of its own weight and that of the potting compost 11, as is shown in FIG. 2b. This movement under the influence of said weight causes flexible porous plate 9 and supporting element 10 to bend until cam 22 rests on bottom 7. Further bending is not possible after this. When the supporting element is loosely supported on wall 5, for example, the indication elements will move a certain distance, due to the bending and deformation of supporting element 10, until they are positioned in space 3 (and space 2). When cam 22 rests on bottom 7, the indication elements 21 only extend a distance A', which is smaller at this location, beyond upright wall 6. Thus it is possible to determine the moisture content of the material 12 during the delivery of moisture from material 12 to the plant roots by providing a colour code or a graduation on the indication elements 21. When the situation as shown in FIG. 2b is reached, distance A' (or other mark) indicates that the moisture in the plant pot must be replenished by the operating staff. Any shortage of moisture in the plant pot can be detected in time by using a suitable code or mark on the indication elements 21. In this embodiment, the moisture content of material 12 is related to the movement of the indication element with respect to the edge of upright wall 5 or 6.

When the supporting element is pivotally connected to the upright wall 5 or 4, displacement of the supporting element 10 (and indication elements 21) due to said bending is not possible, but the indication element 21 will pivot about said pivotal joint. The angular displacement of the indication element will then provide the information about the moisture content of material 12.

The volume reduction of material 12 caused by a decreasing moisture content, as well as the consequent bending of porous plate 9 and the plant and the potting compost 11 has the additional advantage that it disturbs the structure of the potting compost. As it is, said bending leads to the formation of cracks in the potting compost, which has a positive effect as regards the aeration of the potting compost 11. After moisture (water) has been supplied via openings 14, said water will be absorbed by material 12 via space 3 and the openings formed in wall 5, causing said material to increase in volume. As a result, the expanding, moisture-absorbing material 12 will push supporting element 10 and porous plate 9, together with potting compost 11 and the plant, further upwards until the situation as shown in FIG. 2a is reached. Material 12 will now occupy space 2 (practically) completely again. Also during said expansion of material 12, cracks and fissures are formed in potting compost 11, which will enhance the aeration thereof. Thus, an aerobic environment is maintained, which is indispensable to a proper growth development of the plant without any risk of bacteria and/or fungi cultures developing.

As a result of the use of the aforementioned level indication element, the risk of a shortage of water is ruled out, and excess water can flow away over the edge of upright wall 6 or via the openings between upright wall 6 and wall 4.

Figure 3:
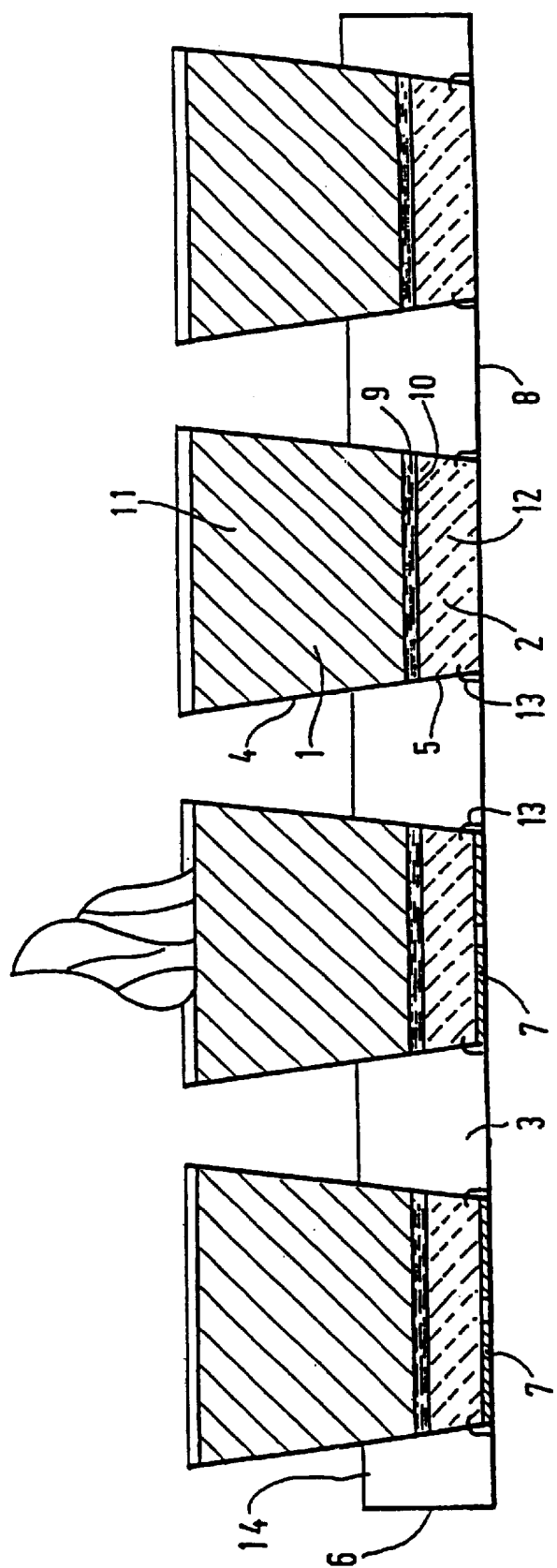
FIG. 3 shows a large-scale application of plant pots according to the invention.

FIG. 3 shows the application on a more industrial scale of several plant pots according to the invention. The figure shows a large space 3, which is bounded by a bottom 8 and an upright wall 6. Several assemblies of spaces 1 and 2 are placed in space 3, which assemblies are connected to the bottom of space 3 by means of snap connections or clamped connections 13. By filling space 3 with water, plants can be raised in the various pots in the above-described manner. The snap connections or clamped connections make it possible to move and/or repot the plants.

It is noted thereby that, as already mentioned before, the space 2 of each of the pots may have its own bottom 7, which may be perforated (as is shown for the two left-hand pots), but it is also possible for space 3 not to have its own bottom, as is shown for the two pots on the right-hand side. In the latter case the contents of space 2 are directly supported on bottom 8.

Nutrients may be added to the water, or material 12 may consist of a substrate, which not only delivers moisture but also nutrients and minerals to the roots.

Figure 4:
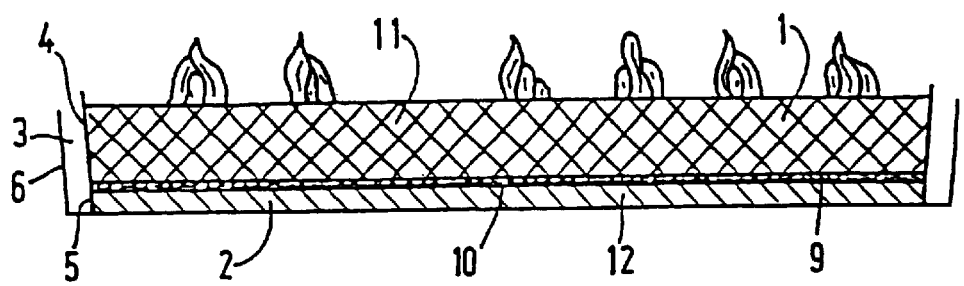
FIG. 4 shows another embodiment of a large-scale application of a plant pot according to the invention.

FIG. 4 shows another embodiment for the large-scale application of a plant pot according to the invention. Rather than in the embodiment of FIG. 3, wherein several plant pots are placed in a large space 3, third space 3 surrounds one enlarged second space 2, in which the moisture-absorbing material 12 is accommodated. Spaces 2 and 1 are separated by means of one or more large, porous plates 9, which may or may not be flexible. Flexible plate (or plates) 9 may be supported by a supporting element 10. Several plants are disposed in side-by-side relationship in a nutrient medium 11 in space 1. A construction of this kind is very suitable for growers who raise plants and the like on a large scale.

Figure 5A:
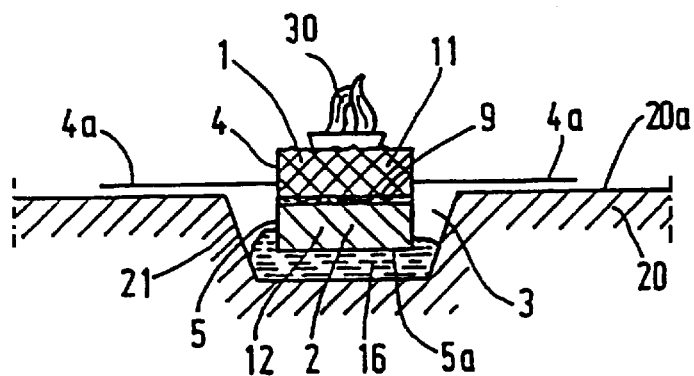
FIGS. 5a and 5b show another embodiment of a large-scale application of a plant pot according to the invention.
Figure 5B:
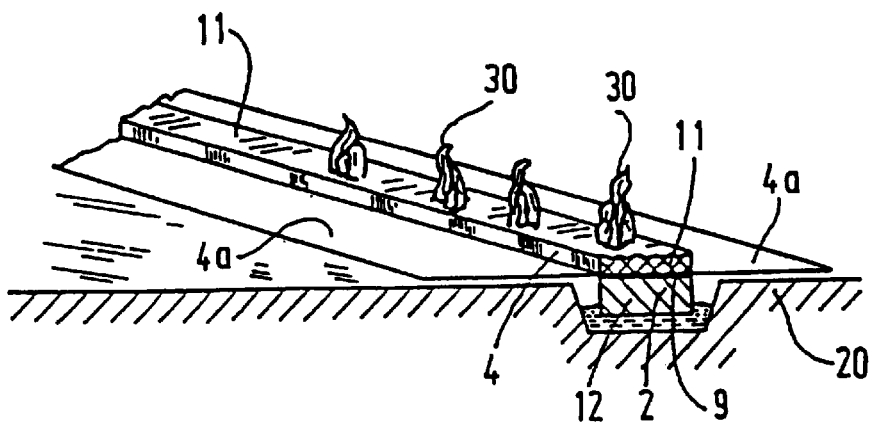

FIG. 5 shows in two views A and B another embodiment of a large-scale application of a plant pot according to the invention. Use is thereby made of irrigation channels 21 which are already present in or on the floor 20 of greenhouses. Said irrigation channels may also be disposed at some height above the floor. An assembly of first and second space 1 and 2 is provided in channel 21, wherein first upright wall of first space 1 is provided with a flange 4a, which rests on floor 20. The assembly of first space 1 and second space 2 is "suspended" in channel 21 thereby. On the other hand it is also possible to place the assembly of said first and said second space directly on the bottom of channel 21. Channel 21 thereby forms the third space 3, which surrounds the first and the second space of the plant pot. Accommodated in space 2 is the moisture-absorbing material 12, which is separated by means of a porous plate 9, which may or may not be flexible, from the nutrient medium 11 for plants 30 which is present in first space 1, which plants (see FIG. 5B) are arranged in a long row above said channel. The water 16 which is present in said channel can be absorbed by material 12 via the openings in wall 5 or in bottom 5a of the second space.

Figure 6:
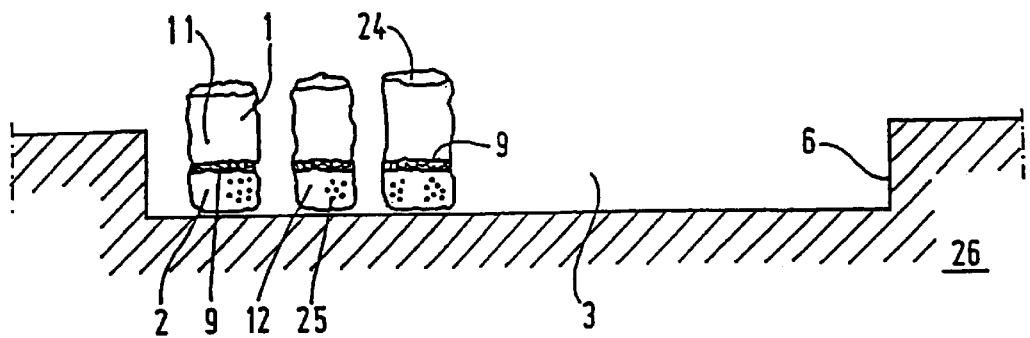
FIG. 6 shows another embodiment of a large-scale application of a plant pot according to the invention.

FIG. 6 shows another large-scale application of a plant pot according to the invention. In this embodiment, the first and the second space (1, 2) of the plant pot are made up of a plastic bag 24, which is open on one side, in which bag a flexible plate 9 is disposed which functions to separate said first and said second space (1, 2) from each other. Said plastic bag 24 is provided with a large number of perforations 25 near the closed bottom side, which perforations function to pass moisture and air. The second space 2 functions to receive the moisture-retaining, hydrating but air-permeable material 12, and the first space functions to receive a nutrient medium (potting compost) 11. Plastic bag 24 can be placed in large numbers in a container 6, which thus forms the third space 3. Said container may be a cultivation tank or a space which has been created in the bottom 26 of a greenhouse.

Figure 7:
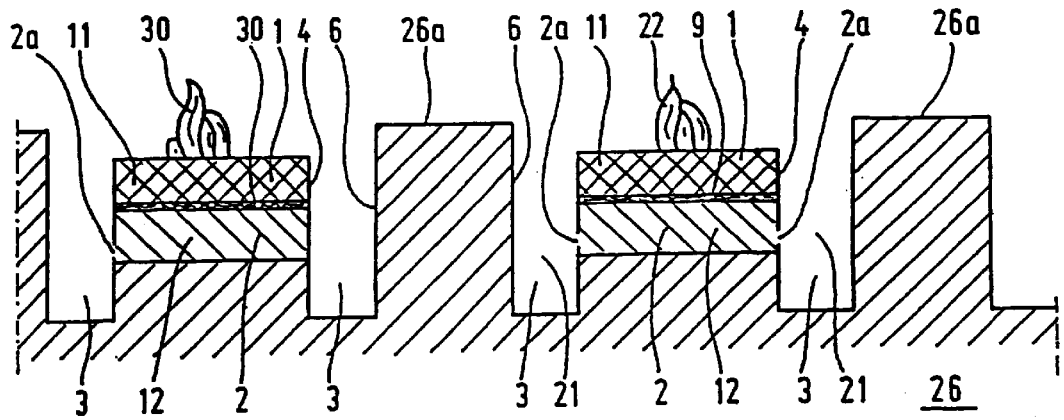
FIG. 7 shows another embodiment of a large-scale application of a plant pot according to the invention.

FIG. 7 shows another large-scale application of a plant pot according to the invention. Several irrigation channels 21 are used herein, which channels are provided in the floor 26 of greenhouses. "Traffic islands" 26a are present between the elongated channels 21 for use by the operating staff. Disposed in channels 21, which form the third space 3, are the assembled first and second spaces of the plant pot according to the invention. Channels 21 thus surround said first and said second space. The numerals herein refer to corresponding parts used in the preceding figures. Moisture (containing nutrients) can find its way from irrigation channels 21 into the second space via openings 2a, where it will be absorbed by the moisture-absorbing, hydrating but air-permeable material 12.

The plant pot is preferably made of plastic. This material not only provides a lightweight construction, but it also enables mass production, for example by means of an injection moulding process, at low manufacturing costs. The plant pot according to the invention may have a shape of circular section, but also other shapes, for example square or rectangular or in the form of a bag are very well possible. Another plastic material which is quite suitable for manufacturing plant pots according to the invention in large numbers and in all kinds of shapes and sizes is polyester.

Figure 8:
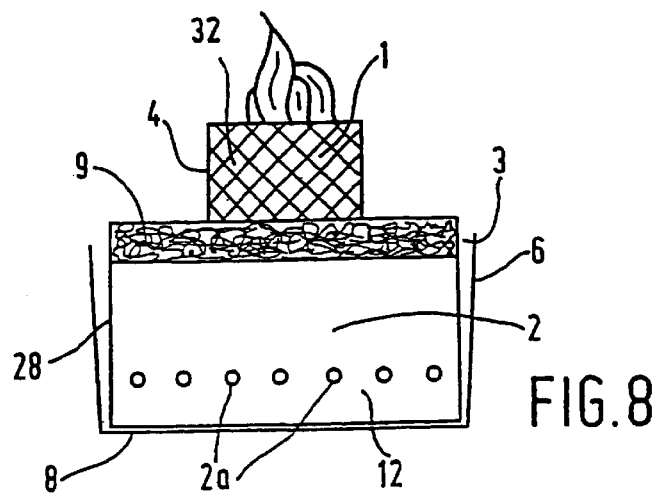
FIG. 8 shows an embodiment of a plant pot according to the invention.

On the other hand it is possible to produce a very cheap and lightweight plant pot by using vegetable fibres, for example cocos fibres, as the material for the plant pot. Also rock wool appears to be a very suitable material, which can function as a nutrient medium or substrate for the plants in said first space. FIG. 8 shows an embodiment wherein rock wool is used. The assembly of first and second space 1 and 2 is disposed in a space 3 which is bounded by a bottom 8 and an upright wall 6. Space 3 is to be filled with water (nutrients). Present in space 1 is a block of rock wool 32, wherein space 1 may be formed by a foil 28 which surrounds said block of rock wool. A plant 22 is placed on top of said block of rock wool 32. Also flexible plate 9 may be made of rock wool, which may form an integral part with the rock wool 32 in space 1. Present in space 2 is a moisture-retaining, hydrating but air-permeable material 12, which may be surrounded by a foil 28. Moisture can enter space 2 from space 3, possibly via openings 2a in wall 5. Furthermore it is possible to make the material 12 of rock wool, which may form an integral part with the flexible plate 9 of rock wool in that case. Material 12 may furthermore be composed of one or more water-retaining products and one or more air-permeable products, such as rock wool containing mineral clay particles or the moisture-retaining, hydrating but air-permeable material.

Although the bottom of the second space is connected to the bottom of the third space by means of snap connections or clamped connections in the illustrated embodiments, it is also possible to use other types of connection. In this regard the use of a rotary connection, such as a lid on a pot may be considered, or the use of velcro or another nonpermanent means of attachment.

Furthermore, the second wall and/or the bottom is (are) provided with openings which enable the supply of water and air from the third space to the second space. It is also possible to make the walls and the bottoms of a watertight but air-permeable or porous material, or to provide said walls and said bottoms therewith. As an additional embodiment, the walls and the bottoms which are made of such a material function as a membrane thereby.

I claim:

1. A plant pot, comprising:
   a first space bounded by a first upright wall and a second space bounded by a second upright wall and a bottom, said first and second space are separated from each other by a porous plate configured to allow the passage of plant roots from said first space to said second space;
   a third space bounded by a third upright wall and a bottom surrounds the second space;
   wherein said second space configured to accommodate a moisture-retaining, hydrating but air-permeable material; and
   at least one indication element extending beyond at least one of the second wall and the third upright wall, which element functions to indicate the moisture content of the a moisture-retaining, hydrating but air-permeable material, wherein said indication element forms at least part of said supporting element.

2. A plant pot, comprising:
   a first space bounded by a first upright wall and a second space bounded by a second upright wall and a bottom, said first and second space are separated from each other by a porous plate configured to allow the passage of plant roots from said first space to said second space;
   a third space bounded by a third upright wall and a bottom surrounds the second space;
   wherein said second space configured to accommodate a moisture-retaining, hydrating but air-permeable material; and
   characterized in that the first and the third wall continue into each other; at least one circumferentially distributed opening is provided between an upper side of the third wall and a bottom side of the first wall and is configured to supply at least one of water, air and nutrients therethrough.

3. A plant pot, comprising:

a first space bounded by a first upright wall and a second space bounded by a second upright wall and a bottom, which first and which second spaces are separated from each other by a porous plate which allows the passage of plant roots from said first space to said second space, wherein a third space bounded by a third upright wall and a bottom surrounds the second space, wherein said second space is substantially filled by a moisture-retaining, hydrating but air-permeable material, at least one indication element extending beyond at least one of the second wall and the third upright wall, which indication element functions to indicate the moisture content of the moisture-absorbing material, and wherein said indication element forms part of said supporting element.

4. A plant pot, comprising:

a first space bounded by a first upright wall and a second space bounded by a second upright wall and a bottom, which first and which second spaces are separated from each other by a porous plate which allows the passage of plant roots from said first space to said second space, wherein a third space bounded by a third upright wall and a bottom surrounds the second space, wherein said second space is substantially filled by a moisture-retaining, hydrating but air-permeable material, and wherein said second upright wall is provided with a large number of openings.

5. A plant pot, comprising:

a first space bounded by a first upright wall and a second space bounded by a second upright wall and a bottom, which first and which second spaces are separated from each other by a porous plate which allows the passage of plant roots from said first space to said second space, wherein a third space bounded by a third upright wall and a bottom surrounds the second space, wherein said second space is substantially filled by a moisture-retaining, hydrating but air-permeable material, and wherein the first and the third wall continue into each other.

6. The plant pot according to claim 5, characterized in that at least one circumferentially distributed opening is provided between the upper side of the third wall and the bottom side of the first wall configured to supply at least one of water, air and nutrients therethrough.

7. A plant pot, comprising:

a first space bounded by a first upright wall and a second space bounded by a second upright wall and a bottom, which first and which second spaces are separated from each other by a porous plate which allows the passage of plant roots from said first space to said second space, wherein a third space bounded by a third upright wall and a bottom surrounds the second space, wherein said second space is substantially filled by a moisture-retaining, hydrating but air-permeable material, and wherein the bottom of the second space can be connected to the bottom of the third space by one of snap connections and clamped connections.

8. A plant pot, comprising:

a first space bounded by a first upright wall and a second space bounded by a second upright wall and a bottom, which first and which second spaces are separated from each other by a porous plate which allows the passage of plant roots from said first space to said second space, wherein a third space bounded by a third upright wall and a bottom surrounds the second space, wherein said second space is substantially filled by a moisture-retaining, hydrating but air-permeable material, and wherein the lower side of the second upright wall can be detachably connected to the bottom of at least one of the second and the third space by one of snap connections and clamped connections.

9. A plant pot, comprising:

a first space bounded by a first upright wall and a second space bounded by a second upright wall and a bottom, which first and which second spaces are separated from each other by a porous plate which allows the passage of plant roots from said first space to said second space, wherein a third space bounded by a third upright wall and a bottom surrounds the second space, wherein said second space is substantially filled by a moisture-retaining, hydrating but air-permeable material, and wherein the first and the second space are in a form of a plastic bag, in which the flexible plate is accommodated, and said plastic bag is configured to be placed into a container which forms the third space.

* * * * *